(12) United States Patent
Burkardt et al.

(10) Patent No.: US 6,481,266 B2
(45) Date of Patent: Nov. 19, 2002

(54) PROCESS FOR CYLINDER-SELECTIVE LEAKAGE TESTING OF THE COMBUSTION CHAMBERS IN A COMBUSTION ENGINE

(75) Inventors: Dietrich Burkardt, Neuenrade (DE); Lutz Finger, Hagen (DE); Roland Oster, Isenbuettel (DE)

(73) Assignee: AFT Atlas Fahrzeugtechnik GmbH, Werdohl (DE)

( * ) Notice: Subject to any disclaimer, the term of this patent is extended or adjusted under 35 U.S.C. 154(b) by 0 days.

(21) Appl. No.: 09/863,555

(22) Filed: May 22, 2001

(65) Prior Publication Data

US 2001/0047681 A1 Dec. 6, 2001

(30) Foreign Application Priority Data

May 25, 2000 (DE) .......................... 100 25 846

(51) Int. Cl.[7] .............................. G01M 3/04
(52) U.S. Cl. ................... 73/49.7; 73/118.1; 702/51
(58) Field of Search .................. 73/49.7, 40, 119 R, 73/120

(56) References Cited

U.S. PATENT DOCUMENTS

| 5,531,100 A | | 7/1996 | Mezger et al. | |
|---|---|---|---|---|
| 5,786,531 A | * | 7/1998 | Lewis et al. | 73/116 |
| 5,945,593 A | * | 8/1999 | Magiera et al. | 73/49.7 |

FOREIGN PATENT DOCUMENTS

| DE | 3105331 | | 9/1982 | |
|---|---|---|---|---|
| DE | 4337720 | | 5/1995 | |
| DE | 4420290 | | 12/1995 | |
| DE | 19529708 | | 1/1997 | |
| DE | 19734680 | | 2/1998 | |
| JP | 54058108 A | * | 5/1979 | G01M/15/00 |
| JP | 61196132 A | * | 8/1986 | G01M/3/26 |

OTHER PUBLICATIONS

U.S. Pat. No. 20010047681A1, Dec. 06, 2001, Burkardt et al., 73/49.7.*

* cited by examiner

Primary Examiner—Daniel S. Larkin
Assistant Examiner—Charles D. Garber
(74) Attorney, Agent, or Firm—W. F. Fasse; W. G. Fasse

(57) ABSTRACT

A process for the cylinder-selective leakage testing of the combustion chambers of a combustion engine is carried out during engine operation, but with the combustion process being suppressed. From the time progression of an engine shaft speed value, engine shaft speed differentials are determined respectively for each cylinder. Then a respective value for the compression pressure is allocated to each engine shaft speed differential. Preferably, the respective engine shaft speed differential is determined as the difference between the minimum engine shaft speed immediately following the top dead center position of a respective cylinder and the subsequent maximum engine shaft speed for this cylinder.

20 Claims, 2 Drawing Sheets

US 6,481,266 B2

PROCESS FOR CYLINDER-SELECTIVE LEAKAGE TESTING OF THE COMBUSTION CHAMBERS IN A COMBUSTION ENGINE

BACKGROUND OF THE INVENTION

The invention concerns a process for the cylinder-selective leakage testing of the combustion chambers in combustion engines during engine operation, but with the combustion process being suppressed, as known from DE 197 34 680 A1.

Engine operation with a suppressed combustion process occurs for instance when the combustion engine is started by means of an electric starter without any fuel being supplied and without any external ignition, or when a motor vehicle rolls on a downhill gradient whilst the engine transmission is engaged and the overrun fuel cut-off is activated.

A device for evaluating the compression of a multi-cylinder combustion engine by means of a process of the general type mentioned above is known for example from DE 43 37 720 A1. With this process, a signal is evaluated which is proportional to the starter current during combustion engine start-up. Here, the significant increase of the required starter current for gas mixture compression during the compression stroke of a cylinder is evaluated. If a cylinder shows a leakage of any kind, this can be detected by measuring the starter current that should normally be applied.

This method of leakage testing the combustion chambers is meaningful for combustion engines with electric starters which are not equipped with the means for detecting the crankshaft rotation angle and determining the current crankshaft speed.

The disadvantage of this process is that the leakage testing of the combustion chambers can be effected only on compression of the gas mixture during the compression stroke of the combustion engine cylinders. Moreover, the components required for measuring the starter current can be used for leakage testing only; therefore, this method of leakage testing is very complicated and expensive.

From the general basis established by DE 197 34 680 A1, there is known a process for the cylinder-selective leakage testing of the combustion chambers in combustion engines by means of detecting the crankshaft rotation angle and determining the current crankshaft speed during motor operation with a suppressed combustion process. With this process, characteristic values are derived and obtained, during the compression and/or combustion strokes of the combustion engine cylinders, from the characteristic curves of the current crankshaft speeds. These characteristic values are correlated to the actual compression pressure in the cylinder combustion chambers, thus providing for leakage defects in the combustion chambers of the combustion engine to be detected cylinder-selectively.

The disadvantage of this process is that the statement on the cylinder-selective compression pressure can be made only by comparing the cylinders against each other. In so doing, this statement will be falsified by unavoidable cross-influencing of all characteristic values among the combustion chambers. Such cross-influencing occurs for example due to the fact that in the event of a combustion chamber having a leakage the rotation of the crankshaft is retarded less so that the combustion chamber which subsequently is to be compressed is actually compressed at a higher crankshaft speed. This makes it impossible to assess the cause of a combustion chamber leakage. In addition, this process cannot be used for combustion engines with just a single combustion chamber.

SUMMARY OF THE INVENTION

It is an object of the invention to provide an improved process for the leakage testing of the combustion chambers in combustion engines, by means of which process the compression pressure within the combustion chambers can be determined directly, with any cross-influences among the combustion chambers being compensated, and which process can also be used for combustion engines having just a single combustion chamber.

The above object has been achieved according to the invention in a process for the cylinder-selective leakage testing of at least one combustion chamber of a combustion engine. In the inventive process, current engine shaft speeds are determined from the engine shaft rotation angles for each cylinder of the combustion engine. Here, engine shaft rotation is subdivided into a limited number of angle corresponding to the number of angle segments to be determined. The crankshaft speed will then change only from one angle segment to the next, i.e. within an angle segment the engine shaft speed will be assumed to be constant.

Next, engine shaft speed differentials will be determined for each cylinder from the course of engine shaft speeds. For this, it is advantageous to use the increase in engine shaft speed following movement of a piston through the top dead center of a cylinder.

These engine shaft speed differentials are each allocated a characteristic value which is preferably formed respectively as a percentage share of the engine shaft speed differential of a cylinder relative to the highest determined engine shaft speed differential of all cylinders.

These characteristic values are allocated the value of the compression pressure, with the maximum compression pressure corresponding to the nominal compression ratio under normal conditions.

The compression pressures determined for each cylinder of the combustion engine are compared with a specified threshold value, if necessary with a cylinder-specifically specified threshold value, with a fault signal being output if the actual value falls below the threshold value.

Before leakage testing of the combustion chambers in the combustion engine is carried out, it is intended that a test for compliance with the constraints prerequisite for any leakage testing is carried out. Such a constraint is the minimum engine shaft speed, for instance, from which the compression pressure can be determined reliably from an engine shaft speed differential.

The engine shaft speed differential of a cylinder is determined by determining the value of the maximum current engine shaft speed differential after the piston of the cylinder has moved through the top dead center position, minus the actual current engine shaft speed directly following the top dead center of the same cylinder of the combustion engine.

In order to improve evaluation precision, the engine shaft speed differentials of the cylinders are corrected relative to these mean engine shaft speeds of the rotation angle segments in accordance with characteristic curves/characteristic fields or an algorithm that can all be applied.

In addition, the cylinder-specific engine shaft speed differentials are corrected relative to the engine temperature by means of characteristic curves that can be applied.

In the case of combustion engines with multiple cylinders the engine shaft speed differential for the next cylinder in the ignition sequence is corrected in relation to the engine shaft speed differential of the last cylinder in the ignition sequence.

A further development of the invention provides for the compression pressures of the cylinders and/or the cylinder-selective engine shaft speed differentials and/or the characteristic values to be stored for comparative purposes after the combustion engine has been manufactured, repaired, or at any other intervals required.

Another further development of the invention provides for irregularities of the compression pressures of the combustion chambers in the combustion engine to be displayed e.g. on the instrument panel of a motor vehicle.

In order to condition the combustion engine it is provided that, before starting the detection of the current engine shaft speeds, the combustion engine runs through e.g. a working cycle corresponding to 720° in crankshaft rotation.

For example, the crankshaft speed, the camshaft speed or the starter shaft speed can be used as engine shaft speeds.

A final development of the invention provides for the leakage test process to be used in combustion engines featuring just a single cylinder, and with the engine shaft speed differential being compared with a stored engine shaft speed differential.

BRIEF DESCRIPTION OF THE DRAWINGS

In the following, the process for cylinder-selective leakage testing will be illustrated and explained using an eight cylinder combustion engine as an example, and in respect of which the crankshaft speed is determined as the engine shaft speed, with reference to the accompanying drawings, wherein.

DESCRIPTION OF THE PREFERRED EMBODIMENTS

Figure 1:
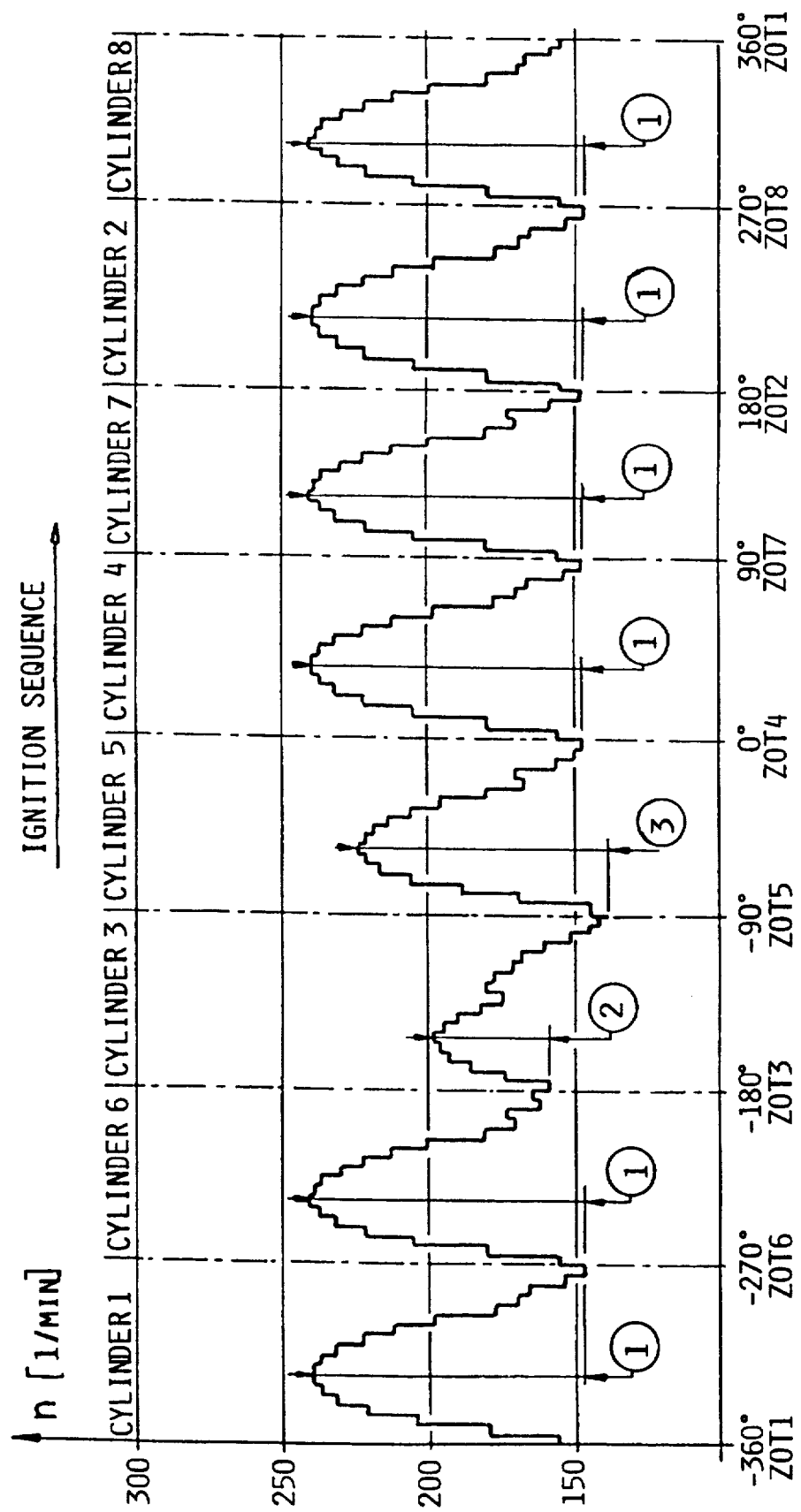
FIG. 1 shows a typical course of the curve for the current crankshaft speeds of the eight cylinder combustion engine over a 720 degree crankshaft rotation angle, with cylinder 3 showing a leakage.

The cylinder-selective leakage testing is effected when starting the combustion engine, with fuel supply and ignition remaining suppressed, and with an electric motor accelerating the crankshaft speed n to an actual value between 150 and 250 revolutions per minute. In the case of a combustion engine operating according to the four-stroke principle, the variation of the crankshaft speed n results from the compression stroke during which a piston will compress the gas mixture contained in the combustion chambers, with closed gas shuttle valves, down to approx. one tenth of the volume. This causes the crankshaft speed n to decrease up to the top dead center, and to increase again thereafter due to the gas mixture expanding again.

For determining the current crankshaft speed n, the crankshaft is equipped with a measuring device and an associated control unit. The measuring device consists of a sensor wheel revolving together with the crankshaft, provided with 36 markings and an additional marking, which are scanned by an induction sensor. From the signals of the induction sensor, the control unit will determine 36 current crankshaft speeds n during a single crankshaft revolution. The additional marking characterizes a crankshaft angle position, known to the control unit, within the working cycle x of the combustion engine, e.g. the top dead center of cylinder i=1.

The markings subdivide a single crankshaft rotation into 36 equal segments, with the induction sensor detecting the interval between two segments. For the control unit, the crankshaft speed n will thus change only from one segment to the next segment, within a segment the crankshaft speed n will be assumed to be constant. The control unit is thus provided with the information on crankshaft speed n and the crankshaft rotation angle at a resolution of 10 degrees.

For the clear allocation of the periodically repeating working cycle x—which comprises two crankshaft rotations—of a combustion engine relative to the crankshaft rotation angle, the camshaft is equipped with a further measuring device enabling detection of the camshaft rotation angle.

The signal sensor of the further measuring device of the camshaft consists of a sensor wheel revolving together with the camshaft, provided with 12 markings and an additional marking, which are also scanned by an induction sensor. The additional marking characterizes a camshaft angle position known to the control unit. From the signals of this induction sensor, the control unit will thus be able to determine the camshaft speed and the camshaft rotation angle at a resolution of 30 degrees.

The measuring device of the crankshaft and the further measuring device of the camshaft enable the control unit to allocate an event within the working cycle x of the combustion engine, which repeats periodically every two crankshaft rotations, to a change in the current crankshaft speed n. For example, the control unit can allocate an increase of the crankshaft speed n to the expansion of the cylinder i=3.

Figure 2:
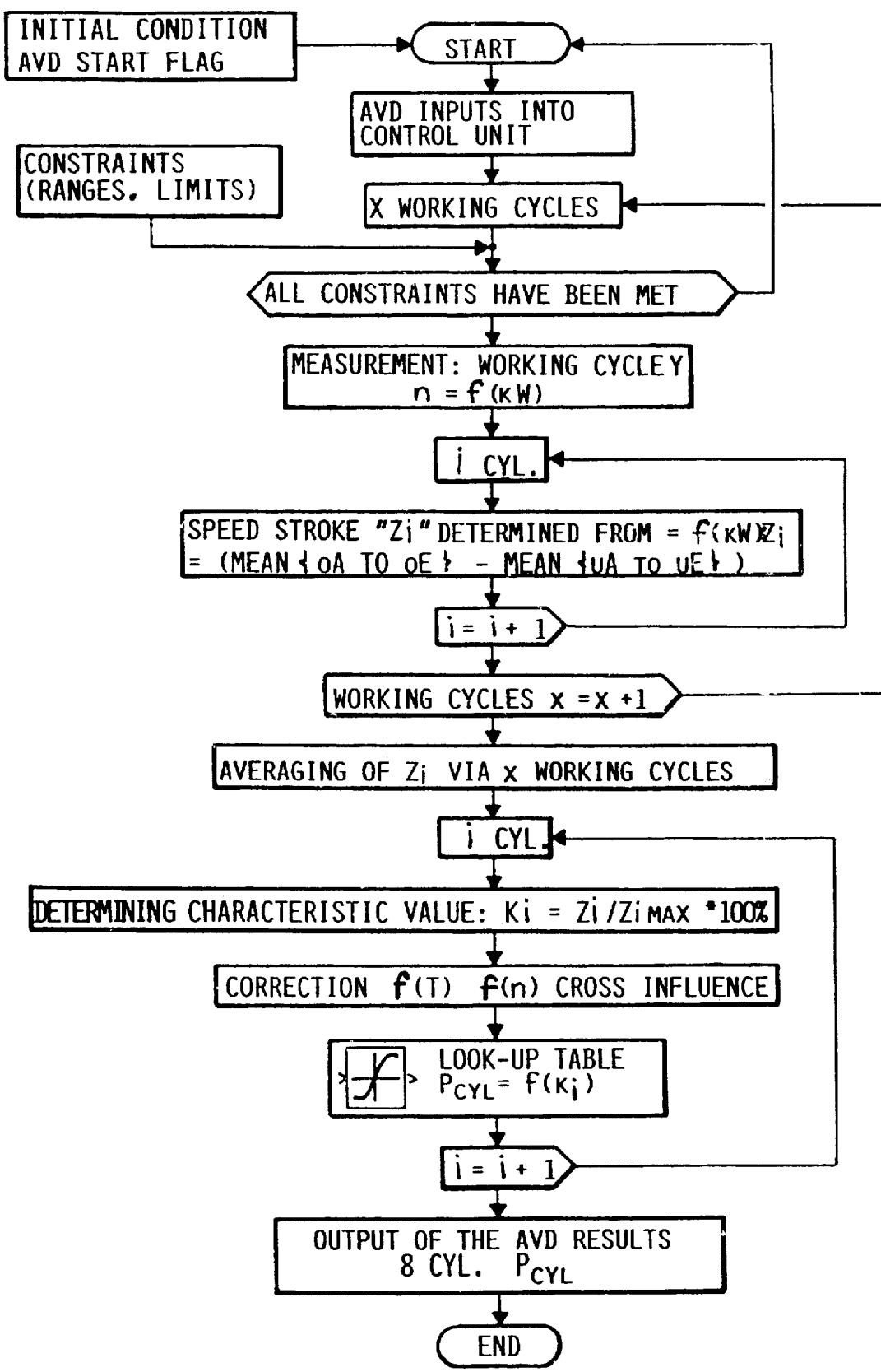
FIG. 2 is a flow chart for the execution of the cylinder-selective compression detection according to the invention.

The automatic compression detection AVD of the combustion chambers need not necessarily occur at each start-up of the combustion engine. The automatic compression detection can be carried out, for instance, when a preset service life of the combustion engine has been reached, following fixed time intervals, or after it has been initiated manually. In order to carry out the automatic compression detection, flag <AVD-Start> will be set in the control unit; this will cause the flow chart shown in FIG. 2 to be run through.

After automatic compression detection has started, default actions to be applied by the control unit will initially be carried out. Thus, for instance, in the case of a diesel engine featuring common rail direct injection the rail pressure will be set to zero; this prevents any emergence of diesel fuel and its ingress into the combustion chambers, even if the fuel injectors are leaking.

In order to be able to carry out a meaningful leakage test of the combustion chambers, by means of which the compression pressure $P_{zyl}$ can be stated in bar for each cylinder i, the constraints that must be complied with need to be specified precisely for each combustion engine. This includes for instance a minimum and a maximum crankshaft speed n during slow starter operation, a minimum temperature of the engine oil, a minimum battery voltage, as well as the suppression of the fuel supply. To this end, the combustion engine must be provided with sensors for determining oil temperature, battery voltage, and fuel supply. If one of the engine-specific constraints is outside an applicable threshold value, then the leakage testing of the combustion chambers will not be carried out, as this leakage testing could be too defective.

In order to test the constraints by means of the sensors; and for the general conditioning of the combustion engine, the starter motor will cause the crankshaft to go through two full rotations (720° crankshaft rotation angle=a single working cycle x of the combustion engine) before the compression pressure $P_{zyl}$ is determined. This avoids any influences on engine speed determination due to the acceleration of the rotating and oscillating engine parts. Also, due to the oil pressure being built up, the lubrication of the combustion engine will begin which again avoids any faults in engine speed determination.

If these constraints are not met, then the start of the automatic compression detection will be re-initiated.

If these constraints are met, the detection of crankshaft speeds n for determining the compression pressure $P_{zyl}$ in the combustion chambers will begin.

Following at least a further working cycle x of the combustion engine (=720° crankshaft rotation angle) each cylinder i will have run through all four working strokes, and 72 current crankshaft speeds n were determined. Such an actual speed curve is shown in FIG. 1. From the curve of the crankshaft speeds n it can be seen that, following the top dead center of each cylinder i, the crankshaft speed n shows a minimum which—on that curve—is then followed by a maximum. This engine shaft speed differential or this speed stroke $Z_i$ of the crankshaft speed n, i.e. the difference between the maximum following the top dead center and the minimum directly following the top dead center of a cylinder i, is used as a measure to determine whether there is any leakage in the combustion chambers.

In order to increase the evaluation precision, several working cycles x, e.g. three working cycles, will be recorded, with a mean value being derived from the values of the crankshaft speeds n of the respective same crankshaft rotation angle within the 720° working cycle x. Compliance with the constraints will be monitored continuously, and, if the actual value exceeds or falls below the threshold value of a constraint, this will cause a re-start of the automatic compression detection.

As a further constraint, it is possible to check here whether the deviation of the respective same values within the working cycle x of the combustion engine does not exceed an applicable threshold value.

For evaluation by the control unit, the cylinder i with the greatest speed stroke $Z_i$ will be regarded as being the cylinder i with 100% compression pressure $P_{zyl}$. A characteristic value $K_i$ between 0% and 100% standardized to the speed stroke $Z_i$ will be allocated to the other seven cylinders i of the combustion engine in line with that speed stroke $Z_i$. The maximum compression pressure $P_{zyl}$ of the nominal compression ratio of the combustion engine will be allocated to the cylinder i with 100% speed stroke $Z_i$. The nominal compression ratio of the combustion engine is stored in the control unit. The percentage share of the maximum compression pressure $P_{zyl}$ corresponding to their characteristic value $K_i$ will be allocated to the other seven cylinders.

If the process is applied to a combustion engine with just a single cylinder i, the determined characteristic value $K_i$ will be compared to a characteristic value $K_i$ of cylinder i stored in the control unit, which value was determined following manufacture of the combustion engine.

In order to increase the evaluation precision even further, it is possible to correct the determined characteristic values $K_i$ of cylinders i with regard to the averaged crankshaft speeds n and with regard to an engine temperature, for example the temperature of the engine oil.

To this end, the influence of the averaged crankshaft speeds n and the engine temperature on the characteristic values $K_i$ will be determined, and stored as a characteristic curve $f_{(T)}$, $f_{(n)}$ in the control unit.

A further influencing quantity, which makes it more difficult to determine the characteristic values $K_i$ of cylinders i correctly, is the cross-influencing among the cylinders i. This cross-influencing results from the fact that a cylinder i with a higher leakage will accelerate the crankshaft less powerfully on expansion of the compressed gas mixture than a cylinder i with a very low leakage. This causes the next cylinder i in the ignition sequence to have a lower speed stroke $Z_i$ even if it is 100% proof against leaks. FIG. 1 shows this cross-influence in relation to the cylinder i=3 featuring a leakage and the next cylinder i=5 in the ignition sequence, which is 100% proof against leaks. Whilst the cylinders i=1,6,4,7,2,8 feature a speed stroke $Z_i$ value ①, which corresponds to a 100% leak proof combustion chamber, the cylinder i=3 features a leakage and only supplies a speed stroke $Z_i$ value ②. This causes the next cylinder i=5 in the ignition sequence to have a lower "accelerating effect" and shows—even if it is 100% proof against leaks—a speed stroke $Z_i$ value ③ which is lower than the speed stroke $Z_i$ value ① of the 100% leak proof cylinders i.

Experiments have shown that it is sufficient to apply the correction only to the next cylinder i+1 in the ignition sequence. The influence on the second successive cylinder i+2 in the ignition sequence is negligibly low.

If, during leakage testing of the combustion chambers, the control unit determines a deviation in the characteristic values $K_i$ of cylinders i, which exceeds an applicable threshold value, this can be indicated on the control panel and/or stored and retrieved again in a specialist workshop for diagnosis purposes. If necessary, whenever a leakage occurs in a combustion chamber the control unit can adapt the engine control system in a suitable fashion, for instance by a reduced firing of the relevant cylinder i.

What is claimed is:

1. Process for the cylinder-selective leakage testing of at least one combustion chamber in a combustion engine, including detecting engine shaft rotation angles and determining current engine shaft speeds during engine operation with suppressed combustion, further comprising the following cyclical process steps:
  a) determining a respective engine shaft speed differential ($Z_i$) to be allocated respectively to each cylinder (i) from the course of the current engine shaft speeds,
  b) forming a characteristic value ($K_i$) proportional to the value of the engine shaft speed differential ($Z_i$),
  c) allocating the characteristic value ($K_i$) to a compression pressure value ($P_{zyl}$), and
  d) comparing the compression pressure value ($P_{zyl}$) to a specified threshold value, to thereby determine a leakage of a respective cylinder if the compression pressure value falls below the specified threshold value.

2. Process according to claim 1 wherein, before engine shaft speeds are detected, further comprising carrying out a test for compliance with constraints prerequisite for any leakage testing.

3. Process according to claim 1, wherein the step a) comprises using an increase in the engine shaft speed following the top dead center of the cylinder (i) in the course of the engine shaft speeds to determine the engine shaft speed differential of the cylinder.

4. Process according to claim 3, wherein the increase in the engine shaft speed is determined as the value of the maximum engine shaft speed following the top dead center of the respective cylinder (i) minus the value of the engine shaft speed directly following the top dead center of the respective cylinder (i), respectively for each cylinder (i) of the combustion engine.

5. Process according to claim 4, wherein the engine has plural cylinders, and the step b) comprises determining the maximum engine shaft speed differential among all of the cylinders, and then forming the respective characteristic value ($K_i$) of a given cylinder (i) among the cylinders as the percentage defined by the ratio of the engine speed differential ($Z_i$) of the given cylinder (i) relative to the maximum engine shaft speed differential ($Z_i$) among all of the cylinders.

6. Process according to claim 1, wherein the step of determining the current engine shaft speeds is carried out with a finite number of engine shaft rotation angles, wherein each two adjacent ones of the engine shaft rotation angles enclose a respective rotation angle segment therebetween, and wherein a respective engine shaft speed is determined for each respective rotation angle segment as the mean engine shaft speed prevailing during the respective rotation angle segment, and further comprising respectively adjusting the values of the engine shaft speed differentials ($Z_i$) allocated respectively to the cylinders (i) in accordance with prescribed characteristic curves ($f_{(n)}$) respectively in relation to the mean engine shaft speeds of the rotation angle segments.

7. Process according to claim 1, further comprising adjusting the value of the engine shaft speed differential ($Z_i$) determined for each cylinder in accordance with prescribed characteristic curves ($f_{(z)}$) respectively in relation to a combustion engine temperature of the combustion engine.

8. Process according to claim 1, wherein the combustion engine has plural cylinders (i), further comprising adjusting the value of the engine shaft speed differential ($Z_i$) for a given cylinder (i) in the ignition sequence in relation to the engine shaft speed differential ($Z_i$) of the prior cylinder (i) preceding the given cylinder in the ignition sequence.

9. Process according to claim 1, further comprising storing the compression pressures $P_{(zyl)}$ of the cylinders (i) and/or the engine shaft speed differentials ($Z_i$) and/or the characteristic values ($K_i$), for comparative purposes after the combustion engine has been manufactured, repaired, or at other required intervals.

10. Process according to claim 1, further comprising displaying or indicating any determined irregularities in the compression pressures ($P_{zyl}$).

11. Process according to claim 1, wherein, before starting the determining of the current engine shaft speeds, further comprising running the combustion engine through at least one working cycle (x).

12. Process according to claim 1, wherein the crankshaft speed (n), the camshaft speed or the starter shaft speed are used as the engine shaft speeds.

13. Process according to claim 1, wherein the process is used for a combustion engine having just a single cylinder (i).

14. Process for the cylinder-selective leakage testing of at least one combustion chamber in a combustion engine, including detecting engine shaft rotation angles and determining current engine shaft speeds during engine operation with suppressed combustion, further comprising the following cyclical process steps:

a) determining a respective engine shaft speed differential ($Z_i$) to be allocated respectively to each cylinder (i) as an increase in the engine shaft speed following the top dead center of the respective cylinder in the course of the current engine shaft speeds, b) forming a characteristic value ($K_i$) proportional to the value of the engine shaft speed differential ($Z_i$), c) allocating the characteristic value ($K_i$) to a compression pressure value ($P_{zyl}$), and d) comparing the compression pressure value ($P_{zyl}$) to a specified threshold value, to thereby determine a leakage of a respective cylinder if the compression pressure value falls below the specified threshold value.

15. A method of testing for leakage of at least one combustion chamber of a combustion engine, comprising the following steps in a respective method cycle:

a) turning-over said engine and causing an engine shaft of said engine to rotate while suppressing ignition and combustion in said engine;

b) determining a succession of respective rotational speed values of a rotational speed of said engine shaft respectively in successive rotation angle segments that make up a complete rotation of said engine shaft and that include plural rotation angle segments allocated to each said combustion chamber;

c) determining a respective rotational speed differential for each respective combustion chamber among said at is least one combustion chamber based on a variation among said rotational speed values in said rotation angle segments that are allocated to said respective combustion chamber; and d) evaluating said rotational speed differential for each said respective combustion chamber to determine if said respective combustion chamber is exhibiting leakage.

16. The method according to claim 15, wherein said step d) comprises allocating a respective characteristic value to each said respective rotational speed differential, then allocating a respective compression pressure value to each said respective characteristic value, and then comparing each said respective compression pressure value to a specified minimum pressure threshold value and thereby determining that said respective combustion chamber is exhibiting leakage if said respective compression pressure value allocated to said respective combustion chamber falls below said specified minimum pressure threshold value.

17. The method according to claim 16, wherein said combustion engine includes only a single combustion chamber, and wherein said step of allocating a characteristic value to said rotational speed differential comprises comparing said rotational speed differential to a stored nominal speed differential value and assigning a characteristic value dependent on a deviation of said rotational speed differential from said stored nominal speed differential value.

18. The method according to claim 16, wherein said combustion engine includes plural combustion chambers, and wherein said step of allocating a respective characteristic value to each said respective rotational speed differential comprises determining an overall maximum speed differential among all of said rotational speed differentials of said plural combustion chambers, and then establishing a respective characteristic value allocated to a given One of said respective rotational speed differentials as a percentage ratio of said given one of said respective rotational speed differentials relative to said overall maximum speed differential.

19. The method according to claim 15, wherein in said step c), said variation among said rotational speed values comprises an increase from one to another of said rotational speed values in said rotational angle segments that are allocated to said respective combustion chamber following a top dead center rotational angle position allocated to said respective combustion chamber.

20. The method according to claim 19, wherein said one of said rotational speed values is a minimum rotational speed value among said rotational speed values allocated to said respective combustion chamber and immediately follows said top dead center rotational angle position, and said another of said rotational speed values is a maximum rotational speed value among said rotational speed values allocated to said respective combustion chamber and pertains in a rotational angle segment subsequent to said minimum rotational speed value.

* * * * *

UNITED STATES PATENT AND TRADEMARK OFFICE
Certificate

Patent No. 6,481,266 B2                                                                                       Patented: November 19, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dietrich Burkardt, Neuenrade, Germany; Lutz Finger, Hagen, Germany; Roland Oster, Isenbuettel, Germany; Peter Bertelshofer, Zirndorf, Germany; Wolfgang Gutbrod, Moehrendorf, Germany; and Reinhold Hagel, Pinzberg, Germany.

Signed and Sealed this Twenty-eighth Day of June 2005.

HEZRON E. WILLIAMS
*Supervisory Patent Examiner*
Art Unit 2856